(No Model.)

W. HEGEL.
ROPE CLAMP.

No. 575,064. Patented Jan. 12, 1897.

Attest:
John Sherman
William Batson

Inventor.
William Hegel, per
Henry J. Miller, Atty.

UNITED STATES PATENT OFFICE.

WILLIAM HEGEL, OF NEWARK, NEW JERSEY, ASSIGNOR OF ONE-HALF TO PHILIP KROELL, OF ELIZABETH, NEW JERSEY.

ROPE-CLAMP.

SPECIFICATION forming part of Letters Patent No. 575,064, dated January 12, 1897.

Application filed January 20, 1896. Serial No. 576,115. (No model.)

*To all whom it may concern:*

Be it known that I, WILLIAM HEGEL, a citizen of the United States, residing at Newark, in the county of Essex and State of New Jersey, have invented a new and useful Improvement in Rope-Clamps, fully described and represented in the following specification and the accompanying drawings, forming a part of the same.

This invention relates to an improvement in adjustable clamps for application to ropes to vary the length of their operative portions, as when stretched between two pulley-blocks for drying clothes; and it consists in the improvement herein shown and described, and specifically set forth in the claim annexed hereto.

The invention will be understood by reference to the annexed drawings, in which—

Figure 1:
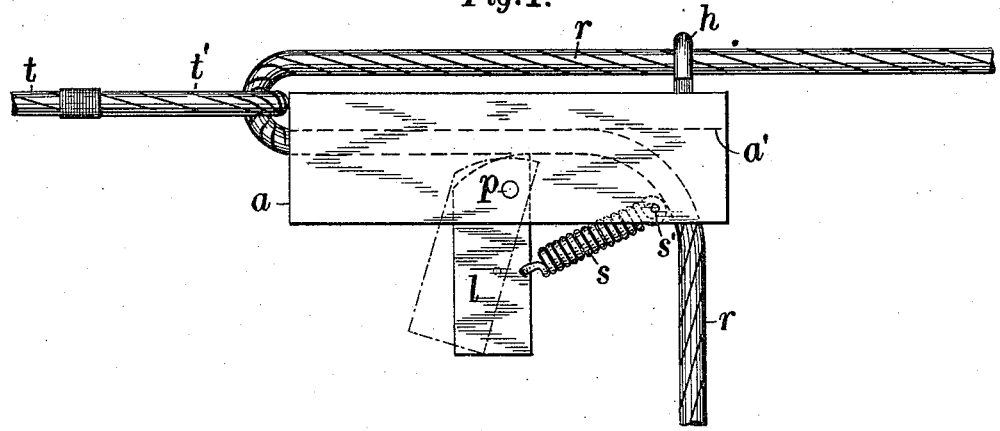
Figure 2:
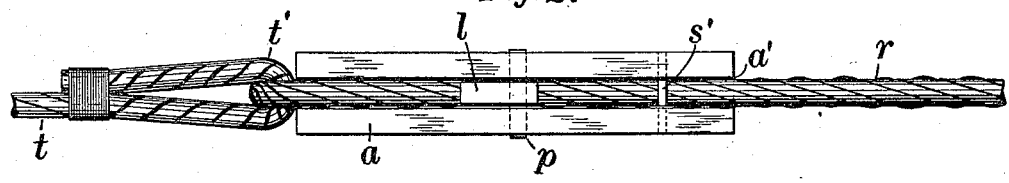
Figure 3:
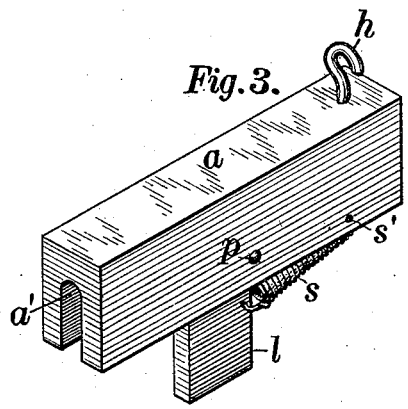

Figure 1 is a side elevation of the improvement applied to a rope to form a loop for engaging a looped rope end, and Fig. 2 is a plan of the same viewed from the under side. Fig. 3 is a perspective view of the clamp detached.

The block $a$ is provided with a groove or channel $a'$ in its under side to receive the rope $r$. A depending lever $l$ is pivoted adjacent to its upper or inner end and near one edge by means of a transverse pin $p$ within the channel $a'$, and held normally at right angles with the inner side of such channel by means of the spiral spring $s$, having one end attached thereto and the other end secured to a transverse pin $s'$ in the channel $a'$ of the block $a$. The upper end of the lever $l$ is beveled downwardly from the edge adjacent to its pivotal pin to afford clearance for the longitudinal movement of the rope $r$ when the lever is shifted backwardly from the spring for the release of the rope, as indicated in dotted lines in Fig. 1, and serves as a cam for grasping or jamming the rope against the bottom of the channel when pressed against the same by the normal action of the spring, as indicated in full lines in said figure.

The rope $r$ is shown passed through a loop $t'$ in the end of a rope $t$ and then under an open hook $h$ upon the top of the block $a$, so as to form a loop for engaging the loop $t'$, the hook $h$ serving as a guide for retaining the rope $r$ and block $a$ in their normal relations.

It will be observed that by the retention of the block $a$ in a parallel relation with the operative portion of the rope $r$ and doubled over the loop $t'$, which is pressed against the end of the block as a fulcrum, the reflex bend in the rope $r$ thus produced offers a material resistance to the slippage of the rope, and thus operates to reduce the tension of that portion of such rope lying in the channel $a'$ and clamped therein by means of the lever $l$, whereby the strength required for the latter, and its transverse pressure and consequent wear upon the rope, is much less than it would be were the adjacent portion of the rope subject to the normal tension where it passes under the hook $h$. A further resistance of a similar nature is offered by the engagement of the rope with the sharp angle of the channel with the end of the block, the rope being in practice bent upon such angle toward the loop $t$ above the same.

By the provision of the open hook $h$ the clamp may be readily disengaged from its normally parallel relation with the line $r$ for convenience in manipulation.

Having thus set forth the nature of the invention, what I claim herein, and desire to secure by Letters Patent of the United States, is—

The rope-clamp consisting of the block formed with a groove or channel in its under side, the lever pivoted therein adjacent to one edge by means of a transverse pin and having its inner end beveled, the spiral spring having one end attached to said lever and the other end secured to said block, and the open hook fixed to the opposite side of the block from the groove or channel on one end thereof, substantially as shown and described.

In testimony whereof I have hereunto set my hand in the presence of two subscribing witnesses.

WILLIAM HEGEL.

Witnesses:
HENRY J. MILLER,
WILLIAM BATSON.